United States Patent
Lappi et al.

(10) Patent No.: US 10,761,834 B2
(45) Date of Patent: Sep. 1, 2020

(54) SSD FIRMWARE DOWNLOAD DUAL BOOT

(71) Applicant: Western Digital Technologies, Inc., San Jose, CA (US)

(72) Inventors: Cory Lappi, Rochester, MN (US); William Jared Walker, Rochester, MN (US); Xin Chen, Rochester, MN (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/136,139

(22) Filed: Sep. 19, 2018

(65) Prior Publication Data

US 2019/0087175 A1  Mar. 21, 2019

Related U.S. Application Data

(60) Provisional application No. 62/561,608, filed on Sep. 21, 2017.

(51) Int. Cl.
*G06F 9/44* (2018.01)
*G06F 8/654* (2018.01)
*H04L 29/08* (2006.01)
*G06F 9/4401* (2018.01)

(52) U.S. Cl.
CPC .............. *G06F 8/654* (2018.02); *G06F 9/441* (2013.01); *G06F 9/4405* (2013.01); *H04L 67/34* (2013.01)

(58) Field of Classification Search
CPC ....................................................... G06F 8/654
See application file for complete search history.

(56) References Cited

U.S. PATENT DOCUMENTS

| | | | |
|---|---|---|---|
| 7,904,895 B1 * | 3/2011 | Cassapakis | G06F 8/654 717/168 |
| 2004/0123282 A1 * | 6/2004 | Rao | G06F 11/1004 717/168 |
| 2006/0107260 A1 * | 5/2006 | Motta | G06F 8/65 717/170 |
| 2009/0222810 A1 * | 9/2009 | Walston | G06F 11/1433 717/172 |
| 2016/0224331 A1 * | 8/2016 | Jia | G06F 8/654 |

* cited by examiner

*Primary Examiner* — Hang Pan
(74) *Attorney, Agent, or Firm* — Patterson & Sheridan, LLP; Steven Versteeg

(57) ABSTRACT

The present disclosure generally relates to using a dual-boot process where existing storage device firmware remains intact while the new firmware is downloaded to a non-volatile location on a fast non-volatile memory drive.

14 Claims, 2 Drawing Sheets

SSD FIRMWARE DOWNLOAD DUAL BOOT

CROSS-REFERENCE TO RELATED APPLICATIONS

The present application claims priority to U.S. Provisional Application 62/561,608, filed Sep. 21, 2017, the entirety of which is incorporated by reference.

BACKGROUND OF THE DISCLOSURE

Field of the Disclosure

Embodiments of the present disclosure generally relate to a storage drive and a method of operating the storage drive. More specifically, embodiments of the disclosure relate to solid state drive dual boot methods and arrangements to accomplish such dual boot methods.

Description of the Related Art

From time to time, firmware needs to be updated. This is particularly true when bugs are discovered in firmware, firmware is rewritten to perform a new task, or firmware is rewritten to perform specified tasks in a different order. Firmware updates to storage drives can be challenging.

Firmware updates need to be downloaded to the drive, but these downloads are typically either power-safe with a long response time or quick without being power-safe. Power-safe is understood to be safe in the event of a power loss.

Currently, firmware updates occur in several manners. One manner is to delay the download of the firmware update to the host until the slow boot media is fully written. Another manner is that when a power cycle occurs during download (i.e., there is a loss of power during the firmware download), the partially downloaded firmware is thrown away and a new download request is reissued from the host. Finally, the device may simply not work and be a "brick".

Therefore, there is a need in the art to have a power-safe download that is quick.

SUMMARY OF THE DISCLOSURE

The present disclosure generally relates to using a dual-boot process where existing storage device firmware remains intact while the new firmware is downloaded to a non-volatile location on a fast non-volatile memory device.

In one non-limiting embodiment, a method for operating an apparatus, is disclosed comprising reading an existing firmware in a non-volatile memory of a first storage device of the apparatus, performing a boot of the apparatus with the existing firmware in the first storage device, checking a second storage drive for a presence of a new firmware during the performing of the boot of the apparatus with the existing firmware, loading the new firmware into a second memory when a new firmware is present in the second storage drive, rebooting the apparatus when the new firmware is present in the second memory and writing the new firmware to the non-volatile memory of the first storage device once the rebooting of the apparatus is complete such that successive rebooting of the apparatus uses the new firmware.

In another non-limiting embodiment, an apparatus is disclosed comprising means for reading an existing firmware in a non-volatile memory of a first storage drive of the apparatus, means for performing a boot of the apparatus with the existing firmware in the first storage drive, means for checking a second storage drive for a presence of a new firmware during the performing of the boot of the apparatus with the existing firmware, means for loading the new firmware into a second memory when a new firmware is present in the second storage drive, and means for writing the new firmware to the non-volatile memory of the first storage drive once the rebooting of the apparatus is complete such that successive rebooting of the apparatus uses the new firmware.

In another non-limiting embodiment, a method for operating an apparatus is disclosed comprising reading an existing firmware in a NOR storage drive, performing a boot of the apparatus with the existing firmware in the NOR storage drive, checking a NAND device for a presence of a new firmware during the performing of the boot of the apparatus with the existing firmware, loading the new firmware into a second memory when a new firmware is present in the NAND drive, rebooting the apparatus with the new firmware when the new firmware is present in the second memory and writing the new firmware to the NOR storage drive once the rebooting of the apparatus is complete such that successive rebooting of the apparatus uses the new firmware.

In another non-limiting embodiment, an apparatus is disclosed comprising means for reading an existing firmware in a NOR storage drive, means for performing a boot of the apparatus with the existing firmware in the NOR storage drive, means for checking a NAND drive for a presence of a new firmware, means for loading the new firmware into a second memory, means for rebooting the apparatus with the new firmware and means for writing the new firmware to the NOR storage drive.

In another non-limiting embodiment, a method is disclosed comprising reading a firmware in a memory; performing a boot of an apparatus that is connected to the memory with an existing firmware stored in the memory; checking for a presence of a new firmware in a device during the performing of the boot with the existing firmware; loading the new firmware into a second memory location when a new firmware is located; rebooting the apparatus when the new firmware is present in the second memory location and writing the new firmware to the memory once the rebooting of the apparatus is complete.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
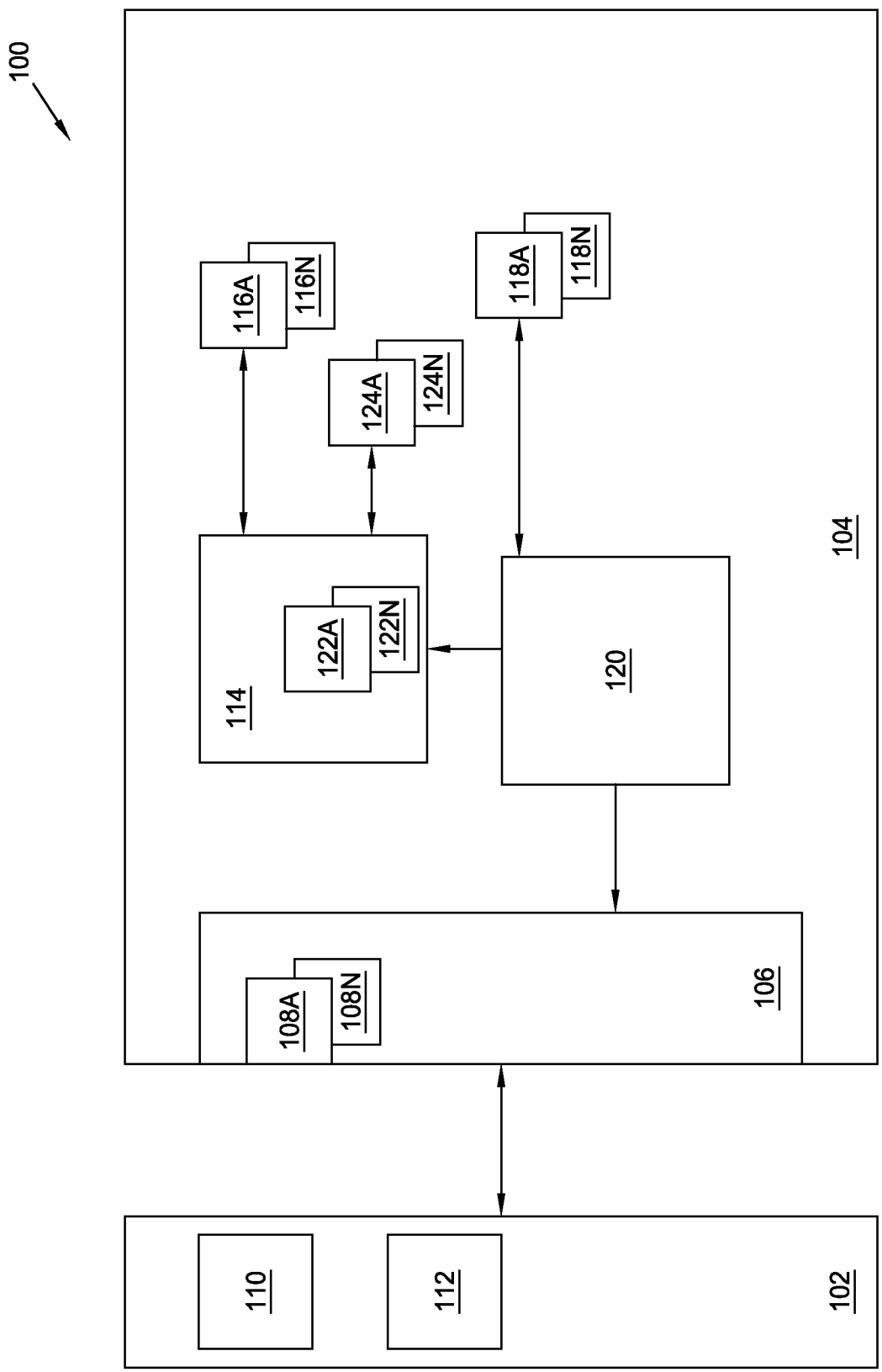
FIG. 1 is a schematic illustration of drive according to one embodiment.

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art that some embodiments may be practiced without many of these details and that numerous variations or modifications from the described embodiments are possible. As used herein, the terms "above" and "below", "up" and "down", "upper" and "lower", "upwardly" and "downwardly", and other like terms indicating relative positions above or below a given point or element are used in this description to more clearly describe certain embodiments.

Aspects of the present disclosure relate to computer operations and computer storage and specifically, dual boot capabilities for solid state drives and devices. In the embodiments described, a data storage arrangement (drive) is connected to the host system. The function of the data storage arrangement, such as a solid state drive, is to accept data and store the data until needed again by a user or the host. The data storage arrangement may be configured to accept bursts of data, depending on the computer process performed, therefore the data storage arrangement is configured with multiple memory units that provide for various states of usage. Certain sections of the data storage arrangement are configured of memory systems that provide for fast action (low latency) so that computer processes may be conducted at a rapid pace. Such low latency performance may be accomplished by single layer cell (SLC) memory configurations. If bulk amounts of data are required to be stored, multiple layer cell memory configurations may also be present, such as triple level cell (TLC) memory configurations. The data storage arrangement may have an interface that allows the data storage arrangement to connect with the host. The interface may be a SAS Interface or Serial ATA (SATA) compatible interface, as a non-limiting embodiment. The memory storage may have a configuration to allow for plug and play ability. Although described as having a SATA compatible interface, the memory storage device may be provided with a configuration which allows for access by wireless technology. In one non-limiting embodiment, 802.11ac technology may be used to provide for fast performance for smooth streaming. Wireless technology may use, for example, between 2.5 GHz to 5 GHz frequencies for connection. In some embodiments, the storage may allow users to choose the frequencies for wireless connection. While being described as SATA compatible, other types of interfaces may be used.

Auxiliary connections may be provided to the data storage arrangement to allow for additional options for inputting data directly to the data storage arrangement without interfacing with the host. Such direct input of data may be provided through placement of an integrated secure digital card to offload or copy data. Other auxiliary connections may be provided for additional input/output operations. Such connections may be USB 2.0, USB 3.0, Firewire or other hard wired configurations. Gigabit Ethernet interfaces and connections may also be used.

The data storage arrangement may be configured with a separate power supply or may be run through other power supply means, such as from a computer mother board. In some embodiments, an internal battery may be provided to power the data storage arrangement as an independent entity. Such configurations may be provided such that the data storage arrangement is a portable unit. In such data storage arrangement configurations, the power supply means may be sufficient to power a host and/or charge a host, such as a mobile cellular phone, personal computer, tablet, camera or other configuration. The data storage arrangement may also have a battery indicator to allow a user to understand the amount of charge in the data storage arrangement from a visual inspection. Such battery indicators may be, for example, low energy consumption light emitting diode technology. In specific embodiments, the data storage arrangement may be provided with a circuit to allow for charging and prevent overcharging of the system if the data storage arrangement is connected to an outside power supply for an extended period. In some embodiments, circuitry may be used to determine if a threshold of inactivity has been reached for the storage system, thereby causing the system to enter a low power consumption mode, conserving battery power.

In one non-limiting embodiment, a controller is provided to control actions of the data storage arrangement as required by the host. The controller may also be configured to perform maintenance activities for the data storage arrangement to allow for efficient use.

Internal software may be provided on the data storage arrangement to allow for efficient storage and read capability of data on the system. Such internal software may be used such that the data storage arrangement can be used as a portable media server to wirelessly stream media to a host or output device. Such output devices may include, but not be limited to, smart televisions, smart phones, stereo audio system. The internal software may also be provided such that the access of data may be performed by cloud applications designed for interface with the data storage arrangement.

The internal software of the data storage arrangement may also be configured to provide for security of the data storage arrangement. Safeguarding of material provided on the data storage arrangement prevents unauthorized access to sensitive information contained on the system. Such security may be in the form of password protection, such as a Wi-Fi password protection. In some embodiments, the data storage arrangement may be configured with software that allows the data storage arrangement to create a hardware lock. Such hardware locks may prevent access through a USB connection.

The internal software may also be capable of providing diagnostic support for users. In such configurations, two different modes may be provided. A quick test software program may be provided with the capability to check the data storage arrangement for major performance problems. A full test mode may also be provided to provide detailed status information to a user. Such status information may be, for example, total amount of memory of the data storage arrangement, the amount of memory storage used, storage divisions provided on the data storage arrangement, firmware versions for the internal software, memory block errors and similar data. The internal software may also have the capability of accepting data to update the firmware of the internal software.

The internal software may also be used as a server system wherein in certain embodiments, Digital Living Network Alliance (DLNA) enabled software is incorporated. Such software allows for quick file transfer and error checked operation as a server. In some embodiments, the internal software may be provided with the capability to use file transfer protocol (FTP) to enable the transfer of content to and from the memory storage in public access folders. The data storage arrangement may also provide for either a secured log in or an anonymous login capability.

In specific embodiments, the data storage arrangement may be configured such that the system interacts with cloud storage systems. In the event that the data storage arrangement approaches the limits of storage capability, the data storage arrangement may allow for some of the data to be stored on cloud based systems. Selection of the data to be stored on such external storage systems may be governed by the controller which is configured to determine what sections of data may be appropriately stored in cloud based systems to minimize latency for users. The data storage arrangement may have a unique identifier MAC address and device name to allow the system to operate on an independent basis. The storage system may also be operated in a configuration that allows for the system to clone a MAC address of a computer that is attached.

The overall capacity of the data storage arrangement may vary according to the different embodiments provided. Capacities 1 TB, 2 TB up to 64 TB may be provided, as non-limiting embodiments. Different form factors may also be provided. In the illustrated embodiment, a form factor of 2.5 inches is provided. Other form factors such as 1.8 inch or 3.5 inch may also be used. Compatibility of the data storage arrangement may be provided for Windows operating systems, Windows Server, Linux and Mac OS, as non-limiting embodiments. Example Windows operating systems that may use the system may be Windows 10, Windows 8 and Windows 7. Example Mac OS systems may be Lion (Mac OSA 10.7), Mountain Lion (Mac OS 10.8), Yosemite (Mac OS 10.10), El Capitan (Mac OS 10.11), Sierra and Mavericks as non-limiting embodiments. Supported browsers for the storage system may be, in non-limiting embodiments, Internet Explorer, Safari, Firefox and Google Chrome.

Software may also be included in the system to allow for quick and automatic backups of data according to user prescribed requirements. Such backup ability may be compliant with Windows based backup and restore functions and/or Apple Time Machine requirements. Furthermore, software may be provided to add more than one user to the storage system. Users can be added or deleted according to an administration account. Such administration account may also allow for restricted access for certain users according to administration requirements.

The present disclosure generally relates to using a dual-boot process where existing storage device firmware remains intact while the new firmware is downloaded to a non-volatile location on a fast non-volatile memory device.

FIG. 1 is a schematic illustration of device 100 according to one embodiment. The device includes a host 102 and a storage drive 104. The host 102 is coupled to the storage drive 104 both physically as well as electronically through an interface 106 that contains one or more phys 108A-108N. Any number of phys 108A-108N may be used.

The host 102 includes a controller 110 as well as a local storage device 112 such as an internal memory. The storage drive 104 also includes a controller 114 that is coupled to and communicates with the interface 106 as well as both the one or more fast or quick non-volatile memory devices 116A-116N and the one or more volatile memory devices 118A-118N. A power supply 120 is coupled to the interface 106 and controller 114. The controller 114 includes one or more processors 122A-122N. Additionally, the controller 114 is coupled to one or more slow non-volatile memory devices 124A-124N. An example of a slow non-volatile memory device 124A-124N is a NOR based arrangement and an example of fast or quick non-volatile memory devices 116A-116N is NAND based arrangement.

In some examples, the storage drive 104 may include additional components not shown in FIG. 1 for sake of clarity. For example, the storage drive 104 may include a printed board (PB) to which components of the storage drive 104 are mechanically attached and which includes electrically conductive traces that electrically interconnect components of storage drive 104, or the like. In some examples, the physical dimensions and connector configurations of the storage drive 104 may conform to one or more standard form factors. Some example standard form factors include, but are not limited to, 3.5" hard disk drive (HDD), 2.5" HDD, 1.8" HDD, peripheral component interconnect (PCI), PCI-extended (PCI-X), PCI Express (PCIe) (e.g., PCIe ×1, ×4, ×8, ×16, PCIe Mini Card, MiniPCI, etc.). In some examples, storage drive 104 may be directly coupled (e.g., directly soldered) to a motherboard of the host 102.

The interface 106 may operate in accordance with any suitable protocol. For example, the interface 106 may operate in accordance with one or more of the following protocols: advanced technology attachment (ATA) (e.g., serial-ATA (SATA) and parallel-ATA (PATA)), Fibre Channel, small computer system interface (SCSI), serially attached SCSI (SAS), peripheral component interconnect (PCI), PCI-express, or Non-Volatile Memory Express (NVMe). The electrical connection of the interface 106 (e.g., the data bus, the control bus, or both) is electrically connected to the controller 114, providing electrical connection between the host 102 and the controller 114, allowing data to be exchanged between host the 102 and the controller 114. In some examples, the electrical connection of the interface 106 may also permit the storage drive 104 to receive power from the host 102. For example, as illustrated in FIG. 1, the power supply 120 may receive power from host 102 via the interface 106.

The storage drive 104 may include the power supply 120, which may provide power to one or more components of the drive 104. When operating in a standard mode, the power supply 120 may provide power to the one or more components using power provided by an external device, such as the host 102. For instance, the power supply 120 may provide power to the one or more components using power received from the host 102 via the interface 106. In some examples, the power supply 120 may include one or more power storage components configured to provide power to the one or more components when operating in a shutdown mode, such as where power ceases to be received from the external device. In this way, the power supply 120 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The storage drive 104 includes one or more volatile memory devices 118A-118N, which may be used by the controller 114 to temporarily store information. In some examples, the controller 114 may use the one or more volatile memory devices 118A-118N as a cache. For instance, the controller 114 may store cached information in the one or more volatile memory devices 118A-118N until the cached information is written to the one or more non-volatile memory devices 116A-116N. The one or more volatile memory devices 118A-118N may consume power received from the power supply 120 to maintain the data stored in the one or more volatile memory devices 118A-118N. Examples of volatile memory include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like)).

The storage drive 104 includes the controller 114, which may manage one or more operations of the storage drive 104. For instance, the controller 114 may manage the reading of data from and/or the writing of data to one or more non-volatile memory devices 116A-116N or one or more volatile memory devices 118A-118N. In some examples, the controller 114 may manage the reading of data from and/or the writing of data to the one or more non-volatile memory devices 116A-116N or one or more volatile memory devices 118A-118N by exchanging signals with the one or more non-volatile memory devices 116A-116N or the one or more volatile memory devices 118A-118N. As discussed above, the controller 114 may exchange signals with the one or more non-volatile memory devices 116A-116N or the one or more volatile memory devices 118A-118N in accordance with a communication protocol.

The controller 114 includes one or more processors 122A-122N. The processors 122A-122N may be configured to execute tasks. The tasks may be of different types, and, in some examples, each respective type of task may be stored in or associated with a respective task queue while waiting for execution by the processor 122A-122N. The different types of tasks may include, for example, front end tasks, which may include receiving and interpreting instructions received from the host device 102. Other types of tasks including caching; back-end tasks, which may include reading data from or writing data to non-volatile memory 116; housing-keeping, which may include garbage collection, wear leveling, TRIM, or the like; and system tasks. In some examples, the processor 122A-122N may be referred to as a computer unit, a processing unit, a core, or a central processing unit (CPU).

As will be discussed in greater detail below, a dual-boot process can be used when new firmware is to be installed. Specifically, the existing firmware remains intact and the new firmware is downloaded to a new non-volatile location on a faster non-volatile memory (for example, the one or more non-volatile memory devices 116A-116N). The existing firmware will typically be stored on the slower non-volatile memory (for example, the one or more non-volatile memory devices 124A-124N).

When the storage drive boots up from a power cycle, the drive will boot into the existing firmware slot (i.e., the one or more non-volatile memory devices 124A-124N) and then check for the existence of any new firmware on the faster non-volatile memory (i.e., the one or more non-volatile memory devices 116A-116N). If any new firmware is found, then the drive loads the new firmware and boots into the new firmware to complete the power-on.

In a specific example, the new firmware is written to non-volatile memory on a fast non-volatile memory device (drive) such as NAND rather than a slow non-volatile memory like NOR. NOR is typically used for firmware storage because NOR is available immediately on power-up. As discussed herein, the boot initially is run through NOR and then the firmware has enough knowledge to boot up NAND and to check the NAND to see if there is a download package for NOR. The new firmware that is in NAND is loaded into DRAM and booted via DRAM. Later on, after boot-up, the firmware in NAND is written into NOR. Even if a power cycle occurs while the firmware is being written to NOR, the new firmware will still be used so long as the new firmware has been written into the NAND. Thus, the firmware download is power-safe as well as fast.

The advantages of the disclosure is that the new firmware can be saved quickly to a high speed media, after which the device (drive) can then guarantee the device (drive) will be able to boot into the new firmware regardless of power loss. The device (drive) then boots into the new firmware and the write buffer command status can go back to the host and indicate the download is complete which will save the time to write the firmware to the typically slower media for booting. The dual-boot provides an elegant way to support delayed download activation by deciding to skip the loading of the new firmware found on the high speed non-volatile memory until the activation is triggered.

Figure 2:
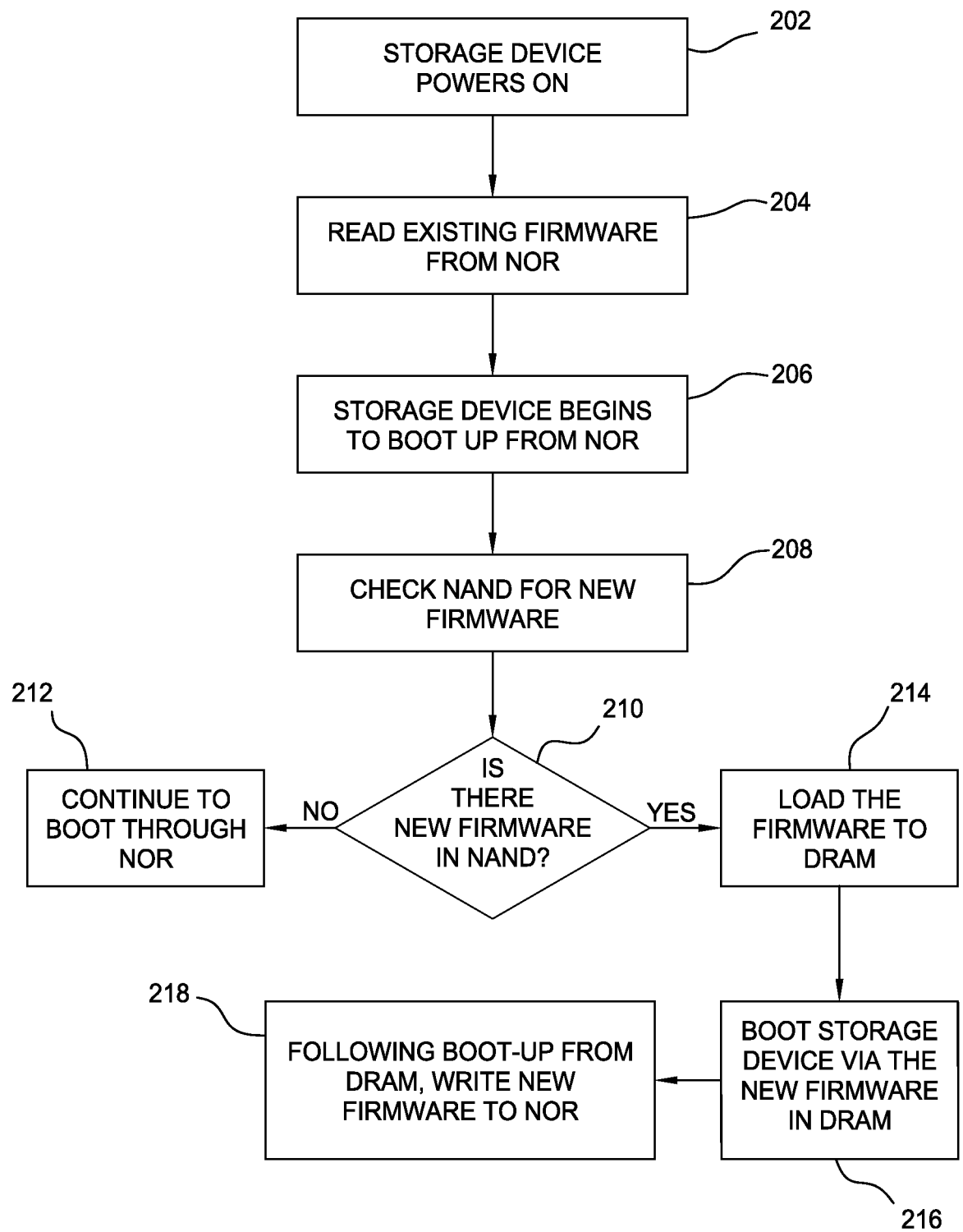
FIG. 2 is a schematic illustration of a method to perform a dual-boot process according to one embodiment.

FIG. 2 is a schematic illustration of a method to perform a dual-boot process according to one embodiment. The process begins at item 202 where the storage drive 104 begins to power on. Thereafter, the controller 114 reads the existing firmware which resides in the slow non-volatile memory such as a NOR storage device in item 204. The storage device 104 begins to boot up with the firmware stored on the NOR storage device in item 206. While the storage drive is booting up, the controller 114 checks the NAND storage device to see if there is new firmware in item 208. If there is no firmware in NAND in item 210, then the boot up continues in item 212. If, however, there is firmware in NAND, then the new firmware that is in NAND is loaded into DRAM in item 214. Then, in item 216, once the new firmware is in DRAM, the storage drive is rebooted with the new firmware in DRAM. Thereafter, in item 218, once the boot-up in DRAM is complete, the new firmware is written to NOR so that subsequent boot-ups will occur through NOR. If there is a power loss during item 218, the new firmware would still be in NAND and DRAM and thus, the process beginning at item 202 would be able to proceed normally and thus, the process is power-safe. As defined, the second memory location may be located within the first storage device or may be a second memory device entirely in non-limiting embodiments.

By using a dual-boot process, new firmware stored in NAND (or other fast non-volatile memory) can be booted from DRAM and safely written to NOR (or other slow non-volatile memory) in a power-safe manner without sacrificing speed.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

In one non-limiting embodiment, a method for operating an apparatus, is disclosed comprising reading an existing firmware in a non-volatile memory of a first storage drive of the apparatus, performing a boot of the apparatus with the existing firmware in the first storage drive, checking a second storage drive for a presence of a new firmware during the performing of the boot of the apparatus with the existing firmware, loading the new firmware into a second memory when a new firmware is present in the second storage drive, rebooting the apparatus when the new firmware is present in the second memory and writing the new firmware to the non-volatile memory of the first storage drive once the rebooting of the apparatus is complete such that successive rebooting of the apparatus uses the new firmware.

In another non-limiting embodiment, the method may be accomplished wherein the first storage drive is NOR based.

In another non-limiting embodiment, the method may be accomplished wherein the second storage drive is NAND based.

In another non-limiting embodiment, the method may be accomplished wherein the second memory is a DRAM memory.

In another non-limiting embodiment, the method may be accomplished wherein the loading the new firmware into the second memory occurs during the boot with the existing firmware.

In another non-limiting embodiment, the method may further comprise erasing the existing firmware in the non-volatile memory of the first storage drive.

In another non-limiting embodiment, the method may further comprise loading the firmware into the second solid state drive prior to reading the existing firmware in a memory of a first solid state drive of the apparatus.

In another non-limiting embodiment, an apparatus is disclosed comprising means for reading an existing firmware in a non-volatile memory of a first storage drive of the apparatus, means for performing a boot of the apparatus with the existing firmware in the first storage drive, means for checking a second storage drive for a presence of a new firmware, means for loading the new firmware into a second memory when a new firmware is present in the second storage drive and means for writing the new firmware to the non-volatile memory of the first storage drive.

In another non-limiting embodiment, the apparatus is disclosed wherein the means for checking the second storage drive for the presence of the new firmware is configured to operate during the performing of the boot of the apparatus with the existing firmware.

In another non-limiting embodiment, the apparatus is disclosed wherein the means for writing the new firmware to the non-volatile memory of the first storage drive is configured to operate once the rebooting of the apparatus is complete such that successive rebooting of the apparatus uses the new firmware.

In another non-limiting a method for operating an apparatus is disclosed comprising: reading an existing firmware in a NOR storage drive, performing a boot of the apparatus with the existing firmware in the NOR storage drive, checking a NAND drive for a presence of a new firmware during the performing of the boot of the apparatus with the existing firmware, loading the new firmware into a second memory when a new firmware is present in the NAND drive, rebooting the apparatus with the new firmware when the new firmware is present in the second memory and writing the new firmware to the NOR storage drive once the rebooting of the apparatus is complete such that successive rebooting of the apparatus uses the new firmware.

In another non-limiting embodiment, the method may further comprise loading the firmware into the NAND drive prior to reading the existing firmware in the NOR storage drive of the apparatus.

In another non-limiting embodiment, the method may be accomplished wherein the writing the new firmware to the NOR storage drive is performed once the rebooting of the apparatus is complete.

In another non-limiting embodiment, the method may be accomplished wherein the writing of the new firmware causes successive reboots of the apparatus to use the new firmware.

In another non-limiting embodiment, the method may further comprise erasing the existing firmware from the NOR storage drive.

In another non-limiting embodiment, an apparatus is disclosed comprising means for reading an existing firmware in a NOR storage drive, means for performing a boot of the apparatus with the existing firmware in the NOR storage drive, means for checking a NAND drive for a presence of a new firmware, means for loading the new firmware into a second memory, means for rebooting the apparatus with the new firmware and means for writing the new firmware to the NOR storage drive.

In another non-limiting embodiment, a method is disclosed comprising reading a firmware in a memory; performing a boot of an apparatus that is connected to the memory with an existing firmware stored in the memory; checking for a presence of a new firmware in a device during the performing of the boot with the existing firmware; loading the new firmware into a second memory location when a new firmware is located; rebooting the apparatus when the new firmware is present in the second memory location and writing the new firmware to the memory once the rebooting of the apparatus is complete.

In another non-limiting embodiment, the method may be performed wherein the memory is in a host.

In another non-limiting embodiment, the method may be performed wherein the second memory location is in the host.

In another non-limiting embodiment, the method may be performed and further comprise rebooting the apparatus at subsequent times involves using the new firmware.

While the foregoing is directed to embodiments of the present disclosure, other and further embodiments of the disclosure may be devised without departing from the basic scope thereof, and the scope thereof is determined by the claims that follow.

What is claimed is:

1. A method for operating an apparatus, comprising:
   reading an existing firmware in a NOR storage device of the apparatus;
   performing a first boot of the apparatus with the existing firmware in the NOR storage device;
   checking a NAND storage device for a presence of a new firmware during the performing of the first boot of the apparatus with the existing firmware, wherein the NOR storage device and the NAND storage device are physically disposed within the apparatus;
   loading the new firmware into a DRAM memory location when a new firmware is present in the NAND storage device;
   rebooting the apparatus when the new firmware is present in the DRAM memory location;
   experiencing a power loss during the rebooting of the apparatus, wherein the new firmware is still present in at least one of the DRAM memory location and the NAND storage device;
   performing a second boot of the apparatus; and
   writing the new firmware to the NOR storage device once the second boot of the apparatus is complete such that successive rebooting of the apparatus uses the new firmware.

2. The method according to claim 1, wherein the DRAM memory location is physically disposed within the apparatus.

3. The method according to claim 1, wherein the loading the new firmware into the DRAM memory location occurs during the first boot with the existing firmware.

4. The method according to claim 1, further comprising: erasing the existing firmware in the NOR storage device.

5. The method according to claim 1, further comprising: loading the new firmware into the NAND storage device prior to reading the existing firmware in the NOR storage device of the apparatus.

6. An apparatus, comprising:
   means for reading an existing firmware in a NOR storage device of the apparatus;
   means for performing a first boot of the apparatus with the existing firmware in the NOR storage device;
   means for checking a NAND storage device for a presence of a new firmware during the performing of the first boot of the apparatus with the existing firmware, the NOR storage device and the NAND storage device being physically disposed within the apparatus;
   means for loading the new firmware into a DRAM memory when a new firmware is present in the NAND storage device;
   means for performing a second boot of the apparatus upon experiencing a power loss, wherein the new firmware is still present in at least one of the DRAM memory and the NAND storage device; and
   means for writing the new firmware to the NOR storage device.

7. The apparatus according to claim 6, wherein the means for writing the new firmware to the NAND storage device is configured to operate once the second booting of the apparatus is complete such that successive rebooting of the apparatus uses the new firmware.

8. A method for operating a solid state drive (SSD), comprising:
   reading an existing firmware in a NOR storage device;
   performing a first boot of the SSD with the existing firmware in the NOR storage device;
   checking a NAND device for a presence of a new firmware during the performing of the first boot of the SSD with the existing firmware, wherein the NOR storage device and the NAND device are physically disposed within the SSD;
   loading the new firmware into a DRAM memory when a new firmware is present in the NAND device, wherein the DRAM memory is located within the NOR storage device or the NAND device;
   rebooting the SSD with the new firmware when the new firmware is present in the DRAM memory;
   experiencing a power loss during the rebooting of the SSD, wherein the new firmware is still present in the DRAM memory and the NAND device;
   performing a second boot of the SSD; and
   writing the new firmware to the NOR storage device once the second booting of the SSD is complete such that successive rebooting of the SSD uses the new firmware.

9. The method according to claim 8, further comprising: loading the new firmware into the NAND device prior to reading the existing firmware in the NOR storage device of the SSD.

10. The method according to claim 8, further comprising: erasing the existing firmware from the NOR storage device.

11. A solid state drive (SSD), comprising:
   means for reading an existing firmware in a NOR storage device;
   means for performing a first boot of the SSD with the existing firmware in the NOR storage device;
   means for checking a NAND device for a presence of a new firmware during the performing of the first boot of the SSD with the existing firmware, wherein the NOR storage device and the NAND device are physically disposed within the SSD;

means for loading the new firmware into a DRAM memory, wherein the DRAM memory is located within the NOR storage device or the NAND device;

means for rebooting the SSD with the new firmware;

means for performing a second boot of the SSD upon experiencing a power loss, wherein the new firmware is still present in the DRAM memory and the NAND device; and means for writing the new firmware to the NOR storage device upon the second booting being complete.

12. The SSD according to claim 11, further comprising:
means for loading the new firmware into the NAND device.

13. The SSD according to claim 12, wherein the means for loading the new firmware is configured to load the new firmware into the NAND device prior to reading the existing firmware in the NOR storage device of the SSD.

14. The SSD according to claim 13, wherein the means for checking the NAND device includes means for performing the first boot of the SSD with the existing firmware.

* * * * *